US006645601B1

(12) United States Patent
Serain et al.

(10) Patent No.: US 6,645,601 B1

(45) Date of Patent: Nov. 11, 2003

(54) PRINTING BLANKET COVER WITH A NARROW CYLINDER ATTACHMENT

(75) Inventors: Hugues Serain, Wattwiller (FR); Denis Hertzog, Berwwiller (FR)

(73) Assignee: Rollin S.A. (FR)

(*) Notice: Subject to any disclaimer, the term of this patent is extended or adjusted under 35 U.S.C. 154(b) by 0 days.

(21) Appl. No.: 09/491,792

(22) Filed: Jan. 26, 2000

(30) Foreign Application Priority Data

Jan. 26, 1999 (FR) ........................................... 99 00828

(51) Int. Cl.[7] ............................ B32B 3/00; B32B 3/02; B32B 27/12

(52) U.S. Cl. ....................... 428/121; 428/122; 428/123; 428/124; 428/125; 428/126; 428/127; 428/128; 428/129; 428/130; 428/192; 428/193; 428/194; 428/195; 428/196; 428/909; 442/59

(58) Field of Search ............................... 442/2, 43, 59; 428/192, 193, 194, 195, 196, 909, 121, 122, 123, 124, 125, 126, 127, 128, 129, 130

(56) References Cited

U.S. PATENT DOCUMENTS 3,395,638 A * 8/1968 Kirkus et al. ............... 101/216
5,644,985 A * 7/1997 Serain et al. ............ 101/415.1
5,749,298 A * 5/1998 Castelli et al. ........... 101/415.1

FOREIGN PATENT DOCUMENTS

| | | |
|---|---|---|
| DE | 4400020 A1 | 8/1995 |
| GB | 2 167 011 | 5/1986 |
| WO | WO 95/21061 | 8/1995 |

OTHER PUBLICATIONS

International Search Report dated Oct. 7, 1999 from French Application No. 9900828 filed Jan. 26, 1999.

Patent Abstracts of Japan, vol. 1995, No. 04, May 31, 1995 and JP 07 001856 A, Mitsubishi Heavy Ind. Ltd., Jan. 6, 1995.

* cited by examiner

*Primary Examiner*—Ula C. Ruddock
(74) *Attorney, Agent, or Firm*—Carmody & Torrance LLP

(57) ABSTRACT

A printing blanket comprising: a) at least one lithographic or printing layer comprising elastomer; b) a compressible layer, c) a reinforcement layer comprising at least one material selected from the group consisting of threads and fibers, wherein at least one free extremity edge has a thickness which is reduced by at least 25% in relation to the thickness of the remainder of the blanket, wherein the at least one free extremity edge having reduced thickness comprises between 5–15% of the overall surface area of the blanket, and wherein the lithographic or printing layer, the compressible layer and the reinforcement layer are continuous from one edge of the blanket to the other.

11 Claims, 2 Drawing Sheets

PRINTING BLANKET COVER WITH A NARROW CYLINDER ATTACHMENT

The present invention concerns a blanket designed for a printing machine having a gap. Such a blanket is classically held on the cylinder, its edges of the free extremity being attached to the interior of the gap.

The presence of this gap entail inconveniences which are well known to the specialist.

First of all, the presence of such a gap induces mechanical vibrations of the cylinder which generate variations in pressure in the nipping zone. These variations affect the quality of printing and the defect known under the name of streaks is very often redhibitory.

Moreover, this defect is the factor limiting the speed of cylinders and thus of the productivity of printing machines.

Another problem associated with rotational offset printing with gap cylinders is the absence of printing at the level of the gap. This constitutes a loss of paper for the printer which can be estimated at about 1.5% of the weight of paper. Then, it is paper which comprises the dominant element in terms of the cost of the printing process.

One can namely cite the document FR-2 660 895 which describes an endless sleeve permitting using gapless cylinders.

This solution is effective but cannot always be utilized. It necessitates in fact a special configuration of printing machines. An endless sleeve can only be introduced axially on a cylinder.

Document FR-2 589 102 for its part describes a device for damping the mechanical vibrations of a cylinder rotating on a gap.

Such a device is effective, but it does not permit reducing the width of the gap, the problem of the loss of paper during printing thus remaining unaffected.

One can furthermore cite document U.S. Pat. No. 5,749,298 which describes a printing blanket called "metal-backed," which has a stack of layers fixed on an interior metal layer ensuring fixation on the printing cylinder.

The structure of such a blanket is not continuous, the stack of layers stopping at the level of the gap and only the magnetic interior layer penetrating to the interior of the gap.

This blanket thus permits reducing the dimension of the gap and vibrations generated at high speeds of rotation.

Nonetheless, such a printing blanket has a major inconvenience. As a matter of fact, its discontinuity in the gap zone constitutes a mechanically weak point in the structure of the blanket.

U.S. Pat. No. 4,537,129 describes an offset printing blanket which is designed to reduce the width of the cylinder gap on which it is held and thus to increase the number of printed lines on the cylinder circumference.

This blanket is constructed in two parts, a compressible thick layer which stops at the level of the gap and a thin printing layer which penetrates into the gap.

This blanket poses problems of adjustment of the two layers superposed around the cylinder. Moreover, it is solely the upper printing layer which supports the entire tension of the blanket which constitutes a limitation on the mechanical plane.

The invention has for its purpose to palliate these inconveniences by proposing a printing blanket the free extremities of which can be inserted and secured in a narrow gap of a blanket-bearing cylinder to ensure the tension of the blanket, all the while maintaining the integrity of the structure of the blanket in a manner so as to limit the vibrations of the cylinders of the printing machine and thus printing errors and to reduce the loss of paper during printing, the blanket not having a mechanically weak point.

Such a blanket thus permits increasing the productivity of printing machines because they can print at a very high speed without loss of quality while realizing economy in paper.

Generally, the invention consists of locally thinning the blanket at the level of its free extremities which should penetrate into the gap of the cylinder.

The invention first of all concerns a process for obtaining a printing blanket of which at least one of the free extremity edges, designed to be retained in the gap of the blanket-bearing cylinder, is thinner than the rest of the blanket, characterized in that it consists:

In creating first of all a printing blanket of a given thickness, the continuous structure of which includes at least one elastomer-based lithographic or printing layer, a layer of compressible material and a reinforcement layer, Of applying a pressure on the free extremity edge of the blanket to bring about a heat compression of this edge, a pressure between 10 and 30 MPa and at a temperature between 100 and 250° C. so that the thickness of this edge is reduced by at least 25% in relation to the rest of the blanket while preserving the integrity of the structure of the blanket.

Preferably, this pressure is applied on the free extremity edges of the blanket and on about 5 to 15% of the overall surface of the blanket.

Advantageously, the process of the invention likewise consists of rigidifying at least one free extremity edge of the blanket to increase the flexion module of the extremity edge.

The process of the invention then consists of placing, before applying the pressure and on at least one of the extremity edges of the blanket, a rigid material or a material designed to become rigid under the action of heat, such as a strip of metal, of plastic material or even a thermoplastic or heat-hardening resin, this material being incorporated into the blanket by the heat compression.

The process of the invention likewise advantageously consists of providing a layer of rigid material on the back of the blanket, comprised by a resin in the form of a liquid or gel, overlaid or impregnated on the back of the blanket, or by a reinforcing film, namely of polyamide, polycarbonate or polyolefin type, and to fix this layer of rigid material on the blanket during the application of heat pressure to increase the traction module of the blanket.

Preferably, mineral or organic fillers, or even fibers and filaments are added to the resin to improve the mechanical properties of the blanket.

Preferably, the process of the invention likewise consists of fashioning at least one free extremity edge of the blanket, imparting to the leading edge an angle falling between 15 and 120° in relation to the printing surface, and giving the trailing edge an angle between 60 and 165° in relation to the printing surface.

The process advantageously consists, after the heat compression operation, of allowing the blanket to cool under pressure to preserve the reduction in thickness of the extremity edge.

The invention likewise concerns a mold for implementing the process of the invention.

This mold is characterized in that it includes two parts, the first of which is perceptibly flat and the second of which is comprised by a plate containing at least one element, such as a bar or something analogous offset in relation to the first part capable of realizing the operation of heat pressure against the first part on a free extremity edge of a printing blanket.

Preferably, the second part includes an internal face in the extension of the element or elements which is designed come in support on the blanket during heat pressure to avoid creep and reduce the concentration of stresses.

In a manner to be able to rigidify at least one free extremity edge of the blanket, the mold of the invention includes, in at least one element, a recess for placing a rigid material, such as a reinforcement strip of metal, or of plastic material.

The invention likewise concerns a printing blanket including at least one relatively thin free extremity edge including at least one elastomer-based lithographic or printing layer, a compressible layer and a reinforcement layer, characterized in that this wire or fiber-based reinforcement layer presents a cover factor between 75 and 96%, preferably between 75 and 88%, as well as a free volume greater than 55%, preferably greater than 64%, this blanket having a thickness reduced by at least 25% in relation to the rest of the blanket on a surface extending on at least one free extremity edge of the blanket and including between 5 and 15% of the overall surface of the blanket.

Preferably, the printing blanket of the invention includes at least one thermoplastic elastomer layer, namely of polyurethane, polyolefm, polystyrene, polyamide, polyester or polyacrylic type, or even a mixture of such polymers.

In this case, the blanket of the invention advantageously includes a reinforcing layer presenting a relatively significant rigidity in the direction of travel, that is to say, parallel to cylinder gap on which the blanket is designed to be mounted.

The blanket of the invention can likewise include at least one elastomer layer the acrylonitrile content of which is at least 16%, the lithographic or printing layer advantageously being of this type.

The blanket of the invention advantageously includes a fabric or mesh presenting a high traction module.

The blanket of the invention likewise advantageously includes a layer of rigid material on the back of the blanket to augment the traction module of the blanket, this layer being namely constituted by a layer of hardened resin or a film, for example, of polyamide.

Preferably, at least one of the free extremity edges of the blank of the invention includes a rigid material incorporated into the blanket, of a strip type of metal, plastic material or even hardened resin to augment the flexion module of the extremity edge and to serve as a means of securing the blanket on the cylinder.

The printing blanket of the invention advantageously includes at least one preformed free extremity edge, the leading edge forming an angle between 15 and 120° in relation to the printing surface, while the trailing edge forms an angle between 60 and 165° in relation to the printing surface.

The invention will be better understood and other purposes, advantages and characteristics of it will become more clearly apparent from reading the description which follows conducted in relation to the appended drawings which illustrate non-limiting embodiments of the invention, and wherein:

FIG. 1 includes FIGS. 1*a*, 1*b* and 1*c* which are views in section, each one illustrating a stage of the process of producing a blanket with thinned edges of the invention;

Elements common to the different figures will be designated by the same reference numbers.

Figure 1A:
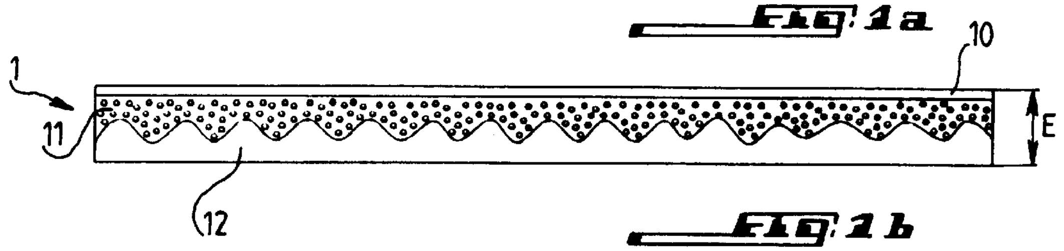
Figure 1B:
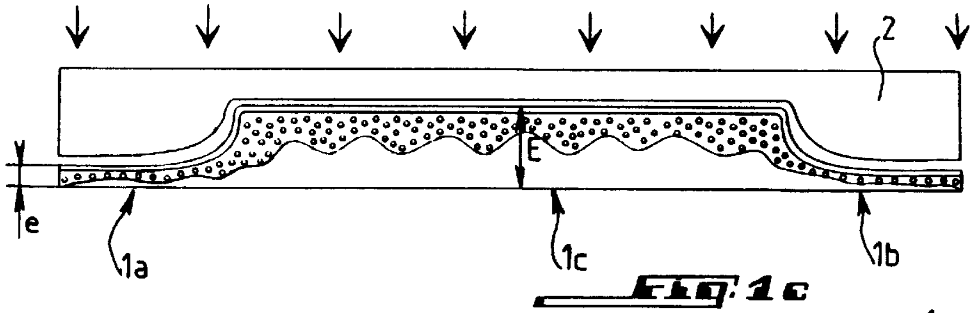
Figure 1C:
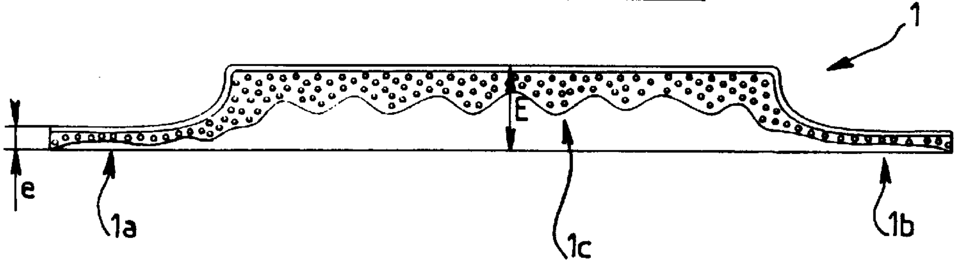

Reference is made first of all to FIGS. 1*a* to 1*c* which schematically illustrate the process of the invention.

FIG. 1*a* illustrates a printing blanket 1 of a given thickness E, this blanket successively including a lithographic or printing layer 10, a layer of compressible material 11 and a reinforcement layer 12. The structure of the blanket 1 is continuous from one edge of the blanket to the other.

The lithographic or printing layer 10 is classically constructed on the basis of elastomers, for example of the average or high acrylonitrile content type.

The cohesion of the blanket can namely be guaranteed by a prior coating of the various constitutive layers with a fine pellicle of adhesive.

The reinforcement layer can be constituted by a single reinforcement of fabric or textile mesh type, or even by a stack of several plies of reinforcement.

Moreover, one or more elastomer layers can be provided in reinforcement layer 12.

Generally, the wire or fiber-based reinforcement presents a residual porosity which is characterized by two parameters: The cover factor and the free volume.

For the sake of convenience, one will consider in the remainder of the discussion that the reinforcement is a fabric, but the invention is not limited to this form of construction. The reinforcement could equally be comprised, for example, by a textile mesh.

The cover factor is defined by the relationship between the "real" surface occupied by fibers on the overall surface of this fabric.

The free volume is defined by the volume occupied by air in a fabric, and thus represents the proportion of free space within this fabric.

This porosity should be sufficiently low so that in the blanket 1, the elastomer layers applied on the fabric remain on the surface.

This relates to the possible elastomer layers present in the reinforcement layer, such as layers playing a particular structural role, such as the layer of compressible material or even the lithographic or printing layer.

Reference is now made to FIG. 1*b* which illustrates another stage of the process according to the invention in which a pressure is applied on the free extremity edges 1*a* and 1*b* of the blanket 1.

This pressure can namely be applied on the blanket 1 by the intermediary of a press 2 presenting an appropriate shape.

The pressure applied on the blanket falls between 10 and 30 MPa, and preferably between 15 and 20 MPa.

Moreover, this pressure is applied by heat, at a temperature between 100 and 250° C., preferably between 120 and 200° C.

As FIG. 1*c* illustrates, owing to this heat compression, the thickness e of the free extremity edges 1*a* and 1*b* of the blanket is reduced by at least 25% in relation to thickness E of the rest of the blanket, or the intermediate part designated 1*c*.

The process of the invention can only be applied to a single free extremity edge of the blanket.

Thus, the printing blanket of the invention includes thinned extremity edges which can be secured in a relatively narrow gap of a printing machine cylinder.

The reduction of the width of the gap permits restricting the vibrations of the cylinder and thus the printing errors, and likewise allows reducing the loss of paper during printing.

Furthermore, the thinning of the free extremity edge of the blanket is brought about without modifying the structure of the blanket because this thinning is obtained without withdrawing material.

The structure of the blanket is always continuous. Only the thickness of at least one part of the layers has been reduced.

In particular, the lithographic or printing layer 10 is preserved which permits protecting the blanket from the penetration and diffusion of liquids such as ink or cleaning solutions which could degrade it.

Moreover, the continuity of the different layers in the thinned extremity edges is retained which avoids any structural weak point. This offers a considerable advantage in relation to the metal-backed blankets of the type described in the document U.S. Pat. No. 5,749,298 or even to the two part blanket such as described in the document U.S. Pat. No. 4,537,29.

During the application of heat compression on the extremity edges of the blanket, the lithographic or printing layer, polymer based, has its thickness reduced. This is likewise the case for layer 11 of compressible material and the reinforcement layer.

As regards this last layer, its porosity should be sufficiently large so that, under the temperature and pressure conditions defined above, each ply of fabric can sink down.

Moreover, when the elastomer layers are provided between the plies of reinforcement fabric, the porosity should permit the creep of elastomer layers toward the interior of the fabric to contribute to thinning the extremity edges of the blanket.

It has been shown that the porosity of the textile reinforcements is advantageously defined in the following manner:

The cover factor falls between 75 and 96%, preferably between 75 and 88% and

The free volume is greater than 55%, preferably greater than 64%.

Under these conditions, before application of the heat pressure, the elastomer layers present in the blanket do not penetrate into the plies of fabric.

On the contrary, during the application of the heat pressure, the porosity is sufficient to obtain a compression of the reinforcement layers by sinking of the plies of fabric and the creep of possible elastomer layers to the interior of the fabric.

Preferably, the blanket is cooled, these free extremity edges remaining subjected to a certain pressure to conserve effectively the reduction in thickness of its extremity edges.

Preferably, the blanket can contain a fabric or mesh presenting a high traction module which would replace one or more reinforcement layers of the blanket.

Figure 2:
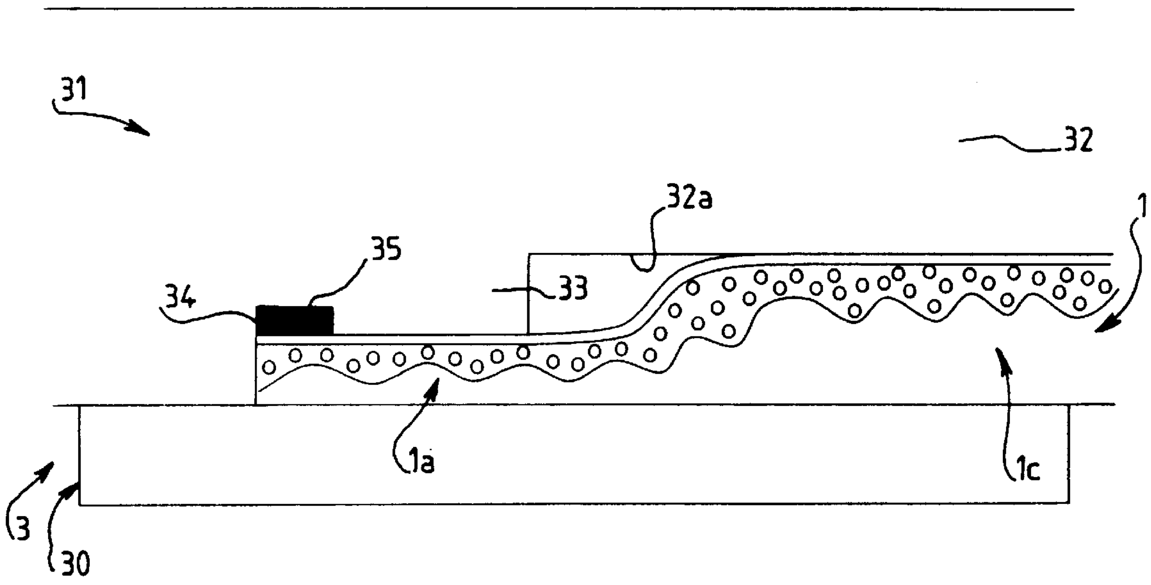
FIG. 2 illustrates, in partial section, a form of construction of a mold for implementing the process of the invention.

Reference is now made to FIG. 2, which illustrates schematically in partial section an example of the mold of the invention to implement the process which has just been described.

This mold has a first part 30 and a second part 31.

The first part 30 of the mold is perceptibly flat and it is designed to accommodate the back of the blanket 1.

The second part 31 of the mold is comprised by a plate 32 having on its inner face 32*a* at least one element 33 such as a bar or the like offset in relation to the first part 30.

This offset element 33 will allow applying a specified pressure on the edge of the extremity 1*a* of the blanket 1.

Of course, if the mold 3 is designed to produce an edge thinned at each free extremity of the blanket, it will have an offset element 33 arranged longitudinally on both sides of the plate 32.

Preferably, the inner face 32*a* of the plate 32 is positioned in a manner to come in support on the intermediate part 1*c* of the blanket during the operation of heat pressure. This permits avoiding the creep of material from the edges of the extremity of the blanket toward its median part and reducing the concentration of stress.

The process of the invention can likewise consist of rigidifying the free extremity edges of the blanket in a manner to augment the flexion module of the free extremity edges.

The blanket obtained is thus easier to manipulate and more resistant at the level of its latching zones into the gap of the cylinder.

The process of the invention includes, for example, a supplementary operation consisting of adding a rigid material on at least one free extremity edge of the blanket.

This rigid material can consist of a strip of metal, rigid plastic, or even a composite of carbon, glass ceramic fibers in particular.

This material can easily be of resin type, the process then consisting of injecting a thermoplastic and heat-hardening resin which is hardened during the operation of heat compression.

In cases where the rigid material appears in the form of a specifically metal strip, this can likewise advantageously serve as a means of latching the blanket in the gap of the cylinder.

To be able to implement this supplementary stage of the process of the invention, at least one element in offset 33 in relation to the plate 32 has a recess 34 designed to accommodate a rigid material 35 or a material designed to become rigid under heat.

This material is incorporated into the free extremity edge 1*a* of the blanket 1 by heat compression.

The process of the invention can equally include a supplemental operation consisting of providing a layer of rigid material on the back of the blanket to augment the traction module of the blanket.

This layer of rigid material can be comprised on the basis of a film of polyamide, polyester or even epoxide resin. This film is stretched to increase its module should the occasion arise.

This layer of rigid material can likewise be constructed on the basis of a resin in the form of a liquid or gel overlaid or impregnated on the back of the blanket or even injected into the mold.

In any case, the layer of rigid material can be fastened to the blanket during the operation of heat compression.

One can equally plan to solidify the reinforcing film using an intermediate adhesive layer.

In the two supplemental operations of the process of the invention which are going to be described, one can plan to add mineral or organic fillers, or even fibers or filaments, to the resin to improve the mechanical properties of the blanket.

In practice, this layer of rigid material on the back of the blanket fulfills the same function as a metal sheet which augments the rigidity of the blanket.

Figure 3:
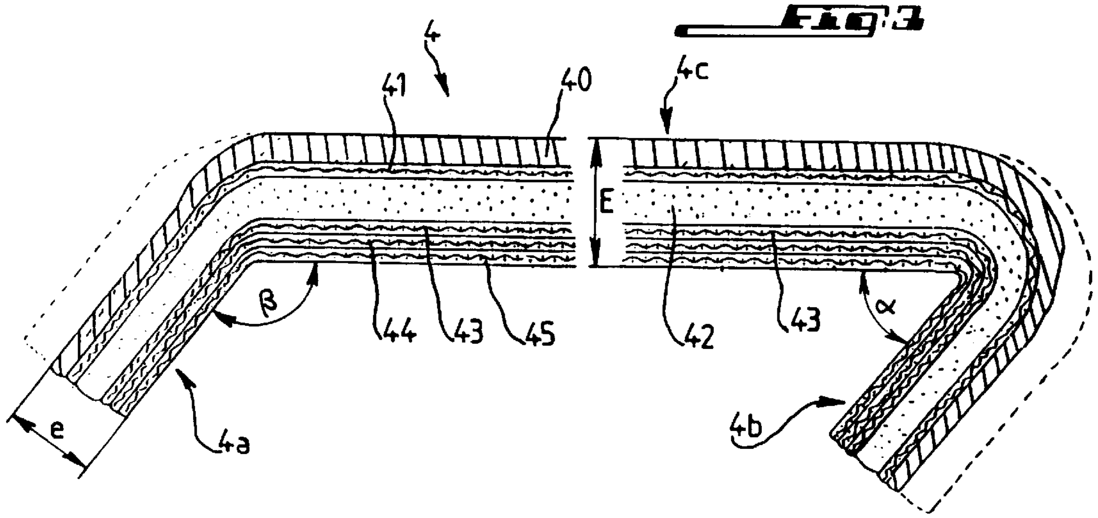
FIG. 3 is a view in section which illustrates a printing blanket of the invention the thinned edges of which are preformed.

Reference is now made to FIG. 3 which illustrates, in transverse section, a printing blanket of the invention the free extremity edges of which have been preformed.

This blanket 4 has successively a lithographic or printing layer 40, a first reinforcing layer 41, a compressible material layer 42 and three other reinforcing layers, 43, 44 and 45, respectively.

The lithographic or printing layer 40 is constructed based on elastomers, for example, of nitrile rubber, with an acrylonitrile content greater than 16%.

The reinforcing layers 41, 43, 44 and 45 have a porosity as defined previously.

The cover factor of these reinforcement layer of textile type thus falls between 75 and 96%, while their free volume is greater than 55%.

One or several elastomer layers of thermoreticulated to thermoplastic type can be provided or not provided in the interior of each reinforcing layer.

By way of example of a textile reinforcing layer, the porosity of which meets the two criteria defined above one can cite the following example of fabric:

Fabric made of AP and polynosic cotton

The warp of which contains 23 threads per centimeter, Nm 34/2 fineness, with a resistance to rupture of 350 N/cm.

The woof of which is executed with 21 threads per centimeter, the fineness of the threads being Nm 34/1, with a resistance to rupture of 10 N/cm.

The fabric surface mass is 210 g/$m^2$

The thickness of the fabric is 0.4 mm.

Such a fabric presents a cover factor of about 77% and a free volume of around 68%.

The layer 42 of compressible material can in particular be executed on the basis of elastomers.

The process of the invention has been applied to the blanket 4 in such a way that its free extremity edges 4*a* and 4*b* have a thickness which is less than the thickness E of the central part 4*c* of the blanket 4. The thickness e is less by at least 25% of thickness E.

This thinning has been obtained a heat compression operation during which the reinforcement layers sink down, the possible elastomer layers present in the reinforcing layers having crept to the interior of the reinforcing fabric.

The compressible material layer 42 has also been crushed during the heat compression operation, like the upper layer 40.

In fact, the operations conducted have shown that a thermoreticulated elastomer layer, such as vulcanized rubber, would conserve a plastic behavior under the influence of heat permitting a thinning under the action of heat compression.

This will run counter to the prejudices of the specialist for whom thermoreticulation of the elastomer is perceived to congeal the material in an irreversible form, impossible to modify subsequently.

This is possible when the elastomer layer has a high acrylonitrile content, greater than 16%.

The dotted lines indicated on FIG. 3 show the shape which the blanket 4 would present if it had not been subjected to the process of the invention.

In addition to this thinning operation of its free extremity edges 4*a* and 4*b*, the blanket has been preformed during the heat compression operation.

This preforming has been accomplished with a mold of particular shape which is not illustrated on the figures.

Thanks to this preforming operation, the leading edge 4*b* of the blanket forms an angle α with the surface of the lithographic or printing layer 40, this angle being about 45°.

Generally, the leading edge 4*b* is preformed such that the angle a falls between 15 and 120°.

The extremity edge 4*a* which constitutes the trailing edge is, for its own part, preformed such that the angle β which it forms with the layer 40 is about 135°.

Generally, the trailing edge is preformed such that the angle β falls between 60 and 165°.

This preforming of the free extremity edges 4*a* and 4*b* of the blanket 4 permits facilitating the positioning of these free extremity edges in the cylinder gap on which the blanket is designed to be mounted.

One can likewise envision automating the assembly of a blanket the thinned edges of which are preformed.

Figure 4A:
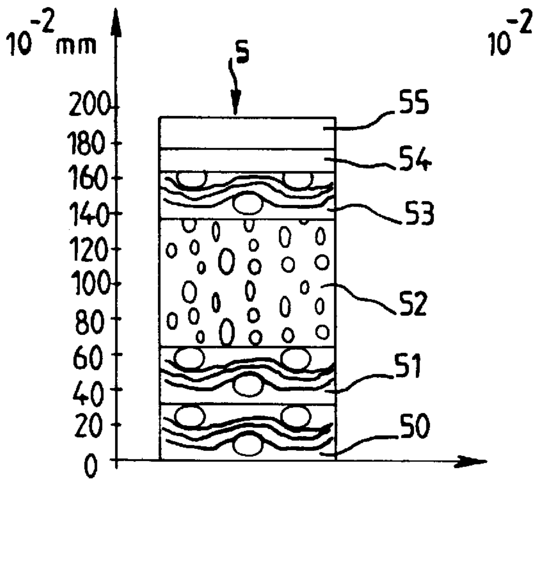
FIG. 4 includes FIGS. 4*a* and 4*b*, which are views in transverse section of a printing blanket of the invention in its middle part (FIG. 4*a*) and of the same blanket at the level of a thinned free extremity edge (FIG. 4*b*).
Figure 4B:
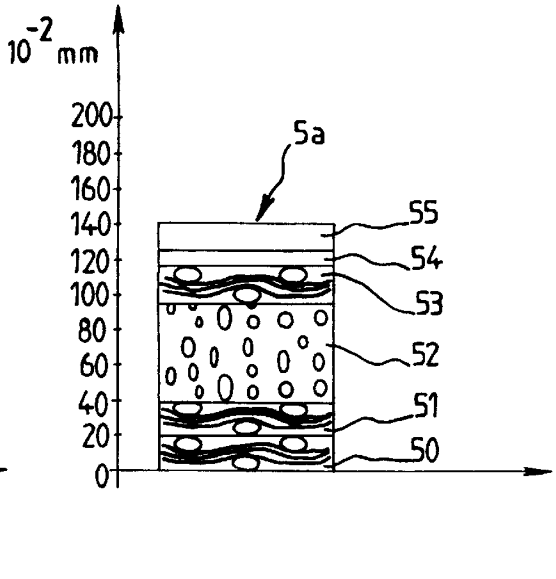

Reference is now made to FIGS. 4*a* and 4*b* which illustrate an example of a blanket before and after application of the process of the invention leading to a thinning of at least one free extremity edge of the blanket.

The blanket 5 represented in FIG. 4*a* has, successively from the back of the blanket, two reinforcing layers 50 and 51, a compressible material layer 52, anther reinforcing layer 53 and finally two elastomer layers 54 & 55.

These two elastomer layers 54 and 55 are executed on an acrylonitrile-butadiene basis where the proportion of acrylonitrile is 25%. The last layer 55 constitutes the lithographic layer of the blanket 5 which permits printing.

The compressible layer 52 is executed in acrylonitrile elastomer with a content of 25%, chemically expanded.

The reinforcement layers 50, 51 and 53 each include a ply of fabric comprised by threads of warp and woof in cotton with a canvas sheath. The cover factor of this tissue is about 75%, while its free volume is around 66%.

Between the various layers constituting the blanket 5, a pellicle of adhesive is provided which allows guaranteeing the cohesion of the entirety of the layers.

The blanket 5 has an overall thickness of about 1.95 mm.

On at least one free extremity edge 5*a* of the blanket 5, a pressure of 25 MPa is applied at a temperature of 200° C.

FIG. 4*b* illustrates the free extremity edge 5*a* of the blanket 5 after cooling under pressure to ambient temperature.

One will note that each layer constituting the blanket 5 has a reduced thickness. The plies of the reinforcement layers are noticeably sunk down.

The thickness of the blanket at the level of its free extremity is about 1.40 mm. It has thus diminished by about 28%.

As previously indicated with regard to FIG. 3, each printing blanket of the invention can have at least one rigidified extremity edge and/or one rigid material layer on its back having the same function as a metal sheet.

The reference signs inserted after the technical characteristics appearing in the claims have as their sole purpose facilitating understanding of the latter and do not limit their scope.

What is claimed is:

1. A printing blanket comprising:

a) at least one lithographic or printing layer comprising elastomer;

b) a compressible layer;

c) a reinforcement layer comprising at least one material selected from the group consisting of threads and fibers;

wherein at least one free extremity edge has a thickness which is reduced by at least 25% in relation to the thickness of the remainder of the blanket;

wherein the at least one free extremity having reduced thickness comprises between 5% and 15% of the overall surface area of the blanket; and wherein the lithographic or printing layer, the compressible layer and the reinforcement layer are continuous from one edge of the blanket to the other.

2. Printing blanket according to claim 1, wherein said printing blanket includes at least one thermoplastic elastomer layer, selected from the group consisting of polyurethane, polyolefin, polystyrene, polyamide, polyester, polyacrylic, and mixtures of the foregoing polymers.

3. Printing blanket according to claim 1, wherein said printing blanket includes at least one elastomer layer the content in acrylonitrile of which is at least 16%.

4. Printing blanket according to claim 1, wherein said printing blanket includes a fabric or mesh.

5. Printing blanket according to claim 1, wherein said printing blanket includes a layer of rigid material on the back of the blanket to increase the traction module of the blanket, this layer comprising hardened resin or film.

6. Printing blanket according to claim 5, wherein said layer of hardened resin comprises polyamide.

7. Printing blanket according to claim 1, further comprising a strip of rigid material incorporated into said at least one free extremity edge of the blanket, wherein said strip of rigid material is selected from the group consisting of metal, plastic material, and hardened resin.

8. Printing blanket according to claim 1, wherein said printing blanket includes at least one preformed free extremity edge, said preformed free extremity edge comprising at least one of a leading edge forming an angle (α) falling between 15 and 120° in relation to the printing surface and a trailing edge comprises and angle (B) falling between 60 and 165° in relation to the printing surface.

9. Printing blanket according to claim 1, wherein said cover factor is between 75 and 88%.

10. Printing blanket according to claim 1, wherein said free volume is greater than 64%.

11. A printing blanket according to claim 1, wherein the at least one free extremity edge having a reduced thickness is formed by applying between 10 and 30 mpa to said edge at a temperature between 100 and 250° C., such that the thickness of said edge is thereby reduced by at least 25% in relation to the thickness of the remainder of the blanket.

* * * * *

UNITED STATES PATENT AND TRADEMARK OFFICE

CERTIFICATE OF CORRECTION

PATENT NO. : 6,645,601 B1
DATED : November 11, 2003
INVENTOR(S) : Hugues Serain et al.

It is certified that error appears in the above-identified patent and that said Letters Patent is hereby corrected as shown below:

<u>Column 10,</u>
Lines 8-11, claims 9 and 10 should read:

9. Printing blanket according to claim 1, wherein said reinforcement layer has a cover factor between 75 and 88%.

10. Printing blanket according to claim 1, wherein said reinforcement layer has a free volume greater than 64%.

Signed and Sealed this

Sixteenth Day of March, 2004

JON W. DUDAS
*Acting Director of the United States Patent and Trademark Office*